Dec. 26, 1967  W. H. BRIGGS ET AL  3,359,943
APPARATUS FOR COATING THE INTERIOR OF TUBULAR MEMBERS
Filed Feb. 25, 1964  3 Sheets-Sheet 1

INVENTORS
WILLIAM H. BRIGGS,
THOMAS C. ARMSTRONG, Jr.
& ROBERT H. WALKER, Jr.

BY  *Shoemaker and Mattare*
ATTORNEYS

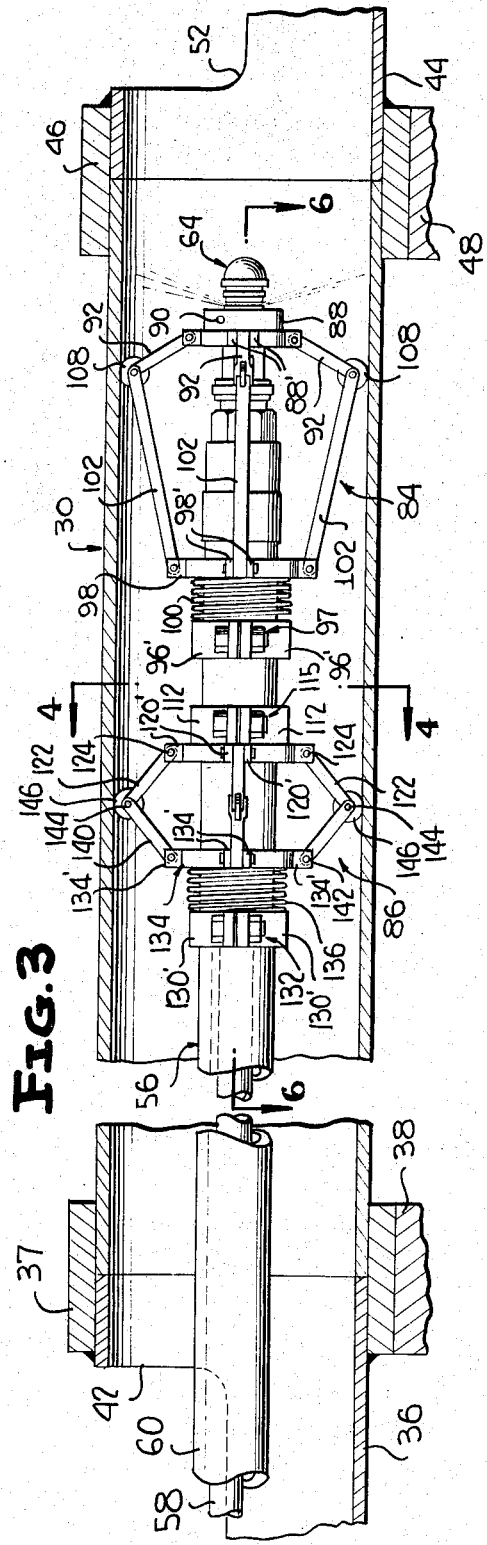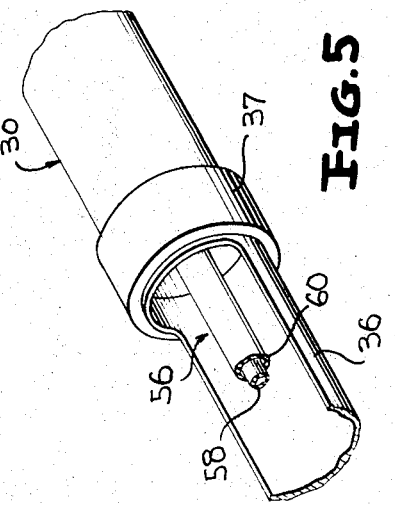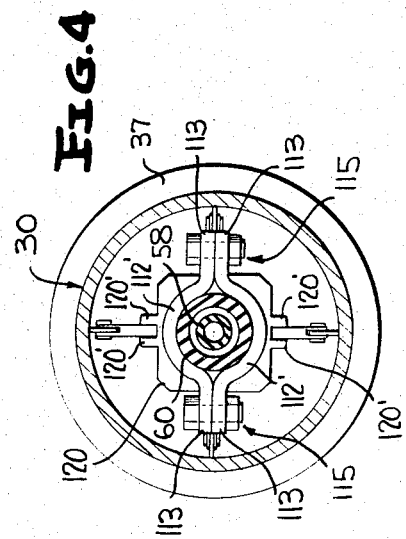

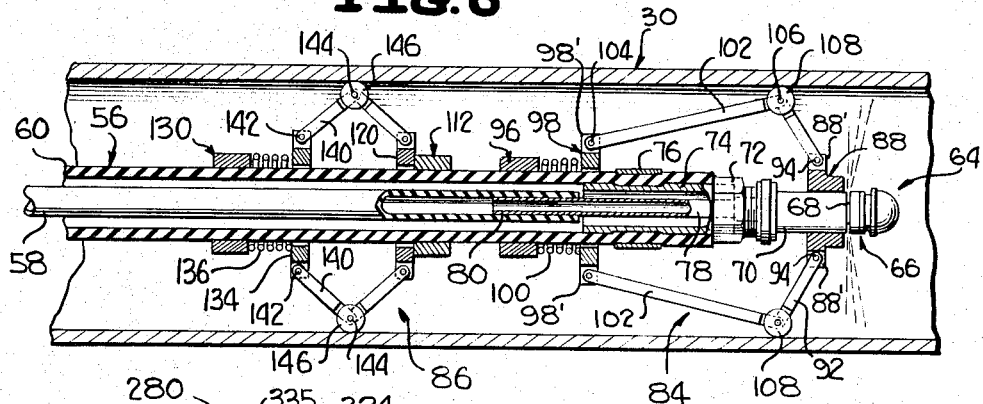

United States Patent Office 3,359,943
Patented Dec. 26, 1967

3,359,943
APPARATUS FOR COATING THE INTERIOR OF TUBULAR MEMBERS
William H. Briggs, Thomas C. Armstrong, Jr., and Robert H. Walker, Jr., Newport News, Va., assignors to Newport News Shipbuilding and Dry Dock Company, Newport News, Va., a corporation of Virginia
Filed Feb. 25, 1964, Ser. No. 347,209
6 Claims. (Cl. 118—306)

ABSTRACT OF THE DISCLOSURE

A discharge nozzle for discharging coating material is connected with a flexible conduit and means is provided for centering the nozzle portion within an associated conduit. Means including a pair of sheaves one of which is resiliently biased toward the other is provided for engaging the flexible conduit portion and for drawing the apparatus through a conduit to be internally coated.

---

The present invention relates to a new and novel method and apparatus for coating the interior of tubular members, and more particularly to such a method and apparatus which is adapted for coating the inner surface of pipes which may have a bend therein.

The present invention is particularly directed to the providing of protective coatings on the interior of pipes which may comprise the vent piping for cargo tanks on tankers, or which may comprise pipe lines as utilized on shore such as in refineries and the like. The protective coating provided on the interior of such pipes may take several forms, and in a typical example the coating may comprise a self-curing inorganic zinc silicate coating on the inner surface of a pipe.

A particular consideration in coating pipes of this type is to provide a dry film thickness within certain critical limits. These limits have been established by experimentation, and it has been determined that the dry film thickness must be within certain specified ranges in order to be effective for the desired purposes. For example, it has been found when utilizing a self curing inorganic zinc silicate coating that the desired dry film thickness should be within the range of 0.003 inch to 0.005 inch. If the coating is either substantially less in thickness or substantially greater in thickness than this desired range, it is proven to be ineffective for the intended purpose.

The method and apparatus of the present invention has been especially designed for utilization in the coating of the interior of pipes which may be up to 20 feet in length with an inner diameter of 5 inches and which may include a bend of 45° therein. It should be understood that the problems involved in coating the interior of a tubular member having a bend therein are considerably greater than those encountered with a straight tubular member. Methods and apparatus which have been successfully employed with straight lengths of pipe cannot be utilized with lengths of pipe having a bend of 45° therein, and accordingly the method and apparatus of the present invention provides a specific arrangement for this particular problem.

In order to obtain the proper thickness of the coating on the interior of the tubular member, two primary considerations arise. Firstly, it is necessary to provide a nozzle which provides a uniform discharge of coating material, and this nozzle must be maintained substantially centered within the tubular member as it moves therethrough while a substantially continuous rate of discharge is maintained therefrom.

The second basic consideration is to provide a substantially uniform accurately controlled rate of movement of the discharge nozzle through the tubular member. By providing a uniform rate of movement, a substantially uniform coating is assured, and by controlling the speed of movement of the nozzle through the tubular member, the thickness of the coating applied to the interior of the tubular member can be accurately controlled.

The apparatus of the present invention incorporates a novel centering means which assures that the discharge nozzle will be maintained centered within the tubular member even when negotiating curves in the tubular member up to 45° or more. The centering means employs a novel arrangement of arm members which are pivotally supported so as to move roller members journalled by the rams outwardly into engagement with the interior of the tubular member. One set of these arms is substantially longer than an interconnected set of arms so as to afford the proper centering of the discharge nozzle as it rounds a bend within an associated tubular member. The apparatus is additionally enabled to negotiate curves in the tubular member due to the fact that the conduit means operatively connected with the discharge nozzle is formed of flexible material which can readily bend and accordingly assume any configuration necessary due to the curved configuration of the tubular member.

The apparatus also includes withdrawal means which engages the flexible conduit means and includes a pair of sheave members one of which is positively driven so as to accurately control the speed thereof. The other sheave means is free running and is continuously resiliently biased toward the driven sheave means so as to clamp the conduit means between the two sheaves and thereby assure a substantially positive driving connection between the sheaves the conduit means. The speed of rotation of the driven sheave means can be controlled as required so as to thereby determine the thickness of the coating applied to the interior of the tubular member.

Extension means is also provided which can be disposed in abutting relationship to the opposite ends of the tubular member to be coated, this extension means enabling the discharge nozzle to move completely through the tubular member to be coated and to move on either side thereof whereby absolutely uniform controlled results can be obtained within the tubular member itself.

The method of the present invention is one which can be carried out in a relatively simple manner by inexperienced personnel and further is substantially foolproof in operation.

An object of the present invention is to provide a new and novel apparatus for coating the interior of tubular members such as pipes which in particular may have a bend formed therein up to 45° or more.

Another object of the invention is the provision of apparatus for coating the interior of tubular members including means for maintaining the discharge spray nozzle substantially centered within the tubular member even when negotiating curves within the tubular member.

A further object of the invention is to provide apparatus for coating the interior of tubular members including withdrawal means which provides a substantially uniform accurately controlled movement of the discharge nozzle through the tubular member thereby providing an accurately controlled thickness of coating throughout the length of the tubular member.

Still another object of the invention is the provision of a method of coating the interior of tubular members which is substantially foolproof in operation and which can be carried out by relatively inexperienced personnel.

Other objects and many attendant advantages of the invention will become more apparent when considered in connection with the specification and accompanying drawings, wherein:

FIG. 3 is a vertical section on an enlarged scale through the tubular member of FIG. 2 illustrating the details of construction of the extension means as well as the centering means;

FIG. 4 is a sectional view taken substantially along line 4—4 of FIG. 3 looking in the direction of the arrows;

FIG. 5 is a top perspective view illustrating the extension means disposed on one end portion of the tubular member to be coated and showing the position of the conduit means therewithin;

FIG. 6 is a vertical section similar to that shown in FIG. 3 showing the interior of the conduit means and the interrelationship of the components associated therewith;

FIG. 7 is a vertical section taken through the withdrawal means and illustrating the interrelationship of the two sheave members;

FIG. 8 is a cutaway view illustrating the manner of interconnection of the conduit means with the trigger mechanism for controlling the flow of coating material through the conduit means; and FIG. 9 is a vertical section through a length of a tubular member to be coated illustrating the coating apparatus in operative position therewithin.

Figure 1:
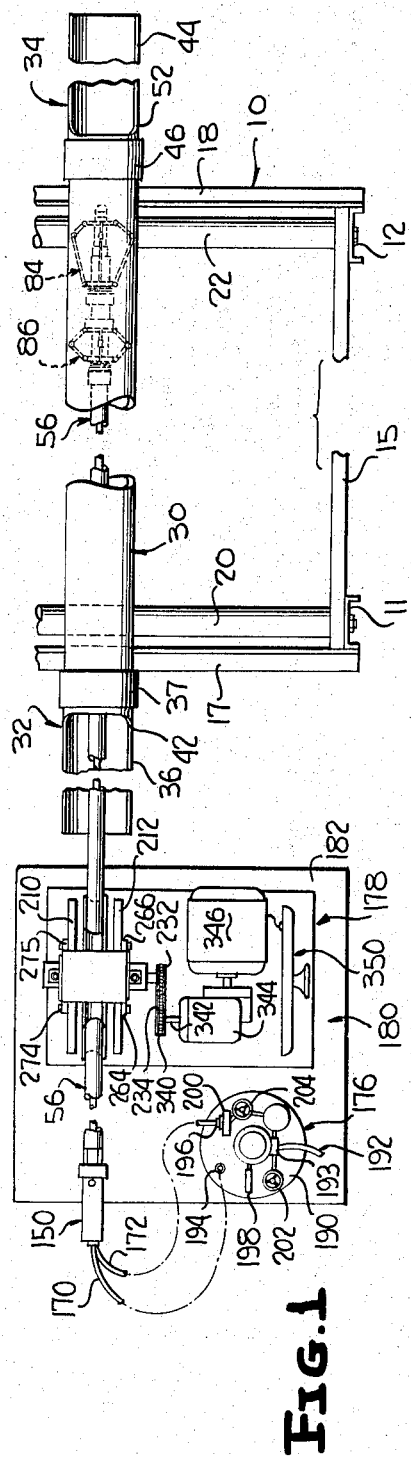
FIG. 1 is a top view illustrating the overall arrangement of the apparatus partly broken away.
Figure 2:
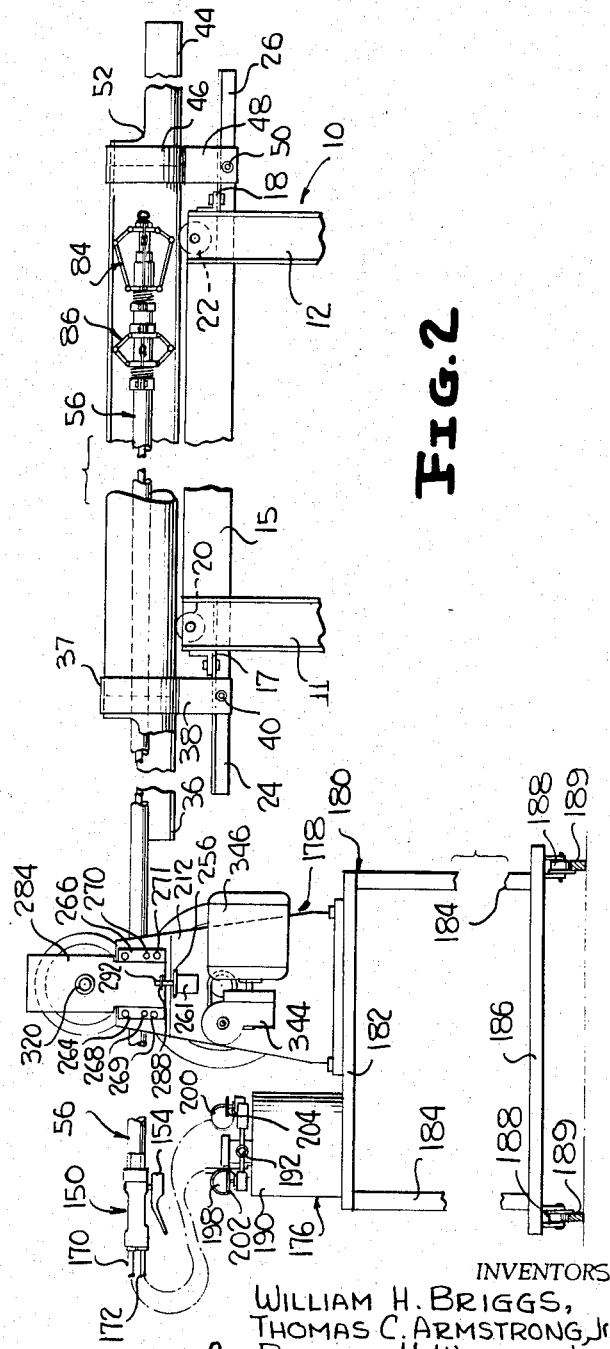
FIG. 2 is a front elevation of the apparatus shown in FIG. 1 partially broken away for the purpose of illustration.

Referring now to the drawings wherein like reference characters corresponding parts throughout the several views, there is shown in FIGS. 1 and 2 a support means for a pipe or tubular member, this support means being indicated generally by reference numeral 10 and including four vertically upright members two of which are shown in the drawings and are illustrated by reference numerals 11 and 12. These upright vertical frame members are interconnected at the upper ends thereof by longitudinally extending frame members 15 suitably secured thereto as by welding or the like. A pair of transversely extending frame members 17 and 18 are connected between the upper ends of the vertically upstanding frame members and are also rigidly affixed thereto as by welding or the like. The interrelationship of these various frame members provides a rigid framework for supporting tubular members thereon.

Any suitable means may be employed on the support means for actually bearing the load of the tubular members supported thereby, and as illustrated in the drawings, a pair of roller members 20 and 22 are provided. These roller members are rotatably journalled at the opposite ends thereof in the longitudinally extending frame members 15, and it will be noted that the roller members extend transversely a substantial distance whereby a plurality of tubular members may be placed thereon such that the tubular members may be coated in sequence as hereinafter described. It is evident that the provision of roller members will facilitate movement of the tubular members onto and off of the support means.

A member 24 is supported from the undersurface of transverse frame member 17 as by nut and bolt assemblies or the like and extends laterally therefrom as seen in FIG. 2. Member 24 may be of substantially T-shaped cross-sectional configuration for a purpose hereinafter described. A similar member 26 is secured to the undersurface of transverse frame member 18 and extends laterally therefrom, member 26 also being of substantially T-shaped cross-sectional configuration for a purpose hereinafter described.

A pair of extension means indicated generally by reference numerals 32 and 34 are provided. The extension means 32 includes an elongated body portion 36 which is substantially cylindrical in configuration, an annular band portion 37 being secured to the inner end thereof as seen most clearly in FIG. 3 as by welding or the like and extending therebeyond as to overlap the adjacent end portion of the pipe 30 to be coated. A depending portion 38 is secured to annular band 37, the lower end of portion 38 being provided with a T-shaped slot which is adapted to receive member 24 previously described whereby the extension means 32 is supported for movement along member 24. A set screw 40 is provided for locking the extension means 32 in a desired position. The outer end of the upper portion of the body portion 36 may be cut away as indicated at 42 whereby body portion 36 is adapted to support the centering means hereinafter described and yet at the same time provide ready access thereto from the top side thereof.

Extension means 34 is of similar construction to extension means 32 and includes a main cylindrical body portion 44 having an annular band portion 46 secured to the inner end thereof and which is adapted to overlap the adjacent end portion of the pipe 30 to be coated. A member 48 extends downwardly from band 46 and is rigidly affixed thereto, the lower end of member 48 being provided with a T-shaped slot adapted to receive the member 26. A set screw 50 is provided for securing the extension means 34 in operative position. The upper half of the outer end portion of extension means 34 may be cut away as indicated at reference numeral 52 for the same purpose as the cutaway provided in the other extension means.

It is evident that the extension means provide a means for rigidly supporting the opposite ends of the tubular member 30 to be coated and thereby provide a means for holding the tubular member in place as well as assisting in the carrying out of the novel method as hereinafter described.

It should be understood that the members 24 and 26 which are of substantially T-shaped cross sectional configuration are adapted to be adjusted into different angular positions so as to accommodate tubular members which have a bend therein. In other words, it is apparent that when the tubular members to be coated have a bend, the extension means 32 or 34 may be disposed at an angle from that shown in FIG. 1 for example, and it is accordingly necessary to adjust one or the other or both of members 24 and 26 so as to properly position the extension means supported thereby.

A conduit means for conducting coating material and air under pressure to the discharge nozzle of the apparatus is indicated generally by reference numeral 56 and includes an inner conduit portion 58 and a spaced outer conduit portion 60, these two portions being concentrically disposed with respect to one another as seen for example in FIG. 6. The inner conduit portion 58 is adapted to conduct the coating material to the spray nozzle and is formed of a suitable flexible material such as rubber having a cloth insert. The interior of this conduit portion must be such as to resist attack from solvents present in the coating material, and accordingly a Thiokol lining is provided on the inner surface thereof. The outer conduit portion 60 is also formed of a suitable flexible material such as rubber having a cloth insert and may comprise a standard air hose. It will be apparent that the overall arrangement is such as to provide a flexible conduit means having concentric passages therein with the liquid coating material passing through the inner passage and the air under pressure passing through the outer passage.

The size of the conduit portions may also be significant since if the size of the passages within the conduit means is too small, excessive pressures may be required for forcing the liquid coating material and the air through the passages, and furthermore there is a possibility of the coating material's setting up on the inner wall of the inner conduit portion thereby restricting or stopping the flow of coating material. Accordingly, it has been found that good results can be obtained with an inner conduit portion having a three-eighths inch inner diameter and an eleven-sixteenth inch outer diameter and with the outer conduit portion having a one-inch inner diameter and one and one-half inch outer diameter.

A discharge nozzle indicated generally by a reference numeral 64 is mounted at the outer end of the flexible conduit means 56, this discharge nozzle including an adjustable portion 66 which enables adjustment of the tip opening which controls the spray pattern. An annular space 68 comprises an opening through which the coating material is discharged, this material being discharged in all directions to create a substantially uniform spray pattern on the interior of the tubular member 30. The discharge nozzle may comprise in a typical example a special No. 50–4367 circular extension head for 12 inch–24 inch diameter spray, fitted with No. 20–5329 tip with six #52 holes and six #40 holes, manufactured by the Eclipse Air Brush Company, 390 Park Ave., Newark, N.J.

Discharge nozzle 64 includes a body portion 70 which is connected by a hex nut 72 with a tubular rigid member 74. The outer end of the conduit portion 60 is fitted tightly about the outer surface of tubular portion 74 and affixed in position by a hose clamp indicated by reference numeral 76. A tubular member 78 is supported concentrically within tubular portion 74 and is operatively connected with the discharge nozzle, tubular portion 78 including an end portion 80 about which the outer end of the inner conduit portion 58 is tightly received. It is accordingly apparent that the two end portions of the conduit portions 50 and 60 are thereby caused to be discharged into the discharge nozzle in a novel manner for producing a discharge spray from the nozzle.

As seen particularly in FIGS. 3 and 6, the centering means of the present invention comprises first and second portions indicated generally by reference numerals 84 and 86. The first portion 84 includes a fixed collar 88 which is fixedly secured on the outer body portion 70 of the discharge nozzle 64 by means of a plurality of screws as indicated by reference numeral 90. Collar 88 is provided with four sets of spaced radially outwardly extending lugs 88', these four sets of lugs being disposed at substantially 90° intervals about the outer portion of the collar. Four arms 92 are pivoted at one end thereof upon pins 94 extending between a pair of lugs 88' on collar 88.

A fixed collar 96 includes a pair of half clamp portions 96' which have laterally extending flange portions secured to one another by nut and bolt assemblies 97 in a well known manner. A movable collar 98 is disposed about the flexible conduit and is adapted to move longitudinally thereof, a compression spring 100 being disposed between collar 96 which is fixed to the outer surface of the conduit means and the movable collar 98 thereby normally urging the movable collar 98 toward the discharge nozzle.

Movable collar 98 is provided with four sets of spaced lugs 98' extending radially outwardly therefrom, and four arm members 102 are pivoted at one end thereof on pins 104 extending between each pair of lugs 98'.

The opposite ends of the arms 92 and 102 are bifurcated and each one of arms 92 is pivotally interconnected with one of arms 102 by means of a pin 106, this pin also serving to rotatably journal a roller 108 within the bifurcated end portions of the associated arms. It is accordingly clear that the spring 100 will normally urge the arms to cause them to pivot upwardly so as to move the roller members 108 into engagement with the inner surface of tubular member 30.

The second portion 86 of the centering means includes a fixed collar 112 comprising a pair of half clamps 112' each having oppositely extending flange portions 113 as seen in FIG. 4 which are interconnected by means of nut and bolt assemblies 115 to thereby clamp the fixed collar 112 in operative position. A collar 120 is similar in construction to collar 98 and is provided with four sets of spaced lugs 120' disposed at substantially 90° with respect to one another. Collar 120 is disposed about the flexible conduit and bears against the fixed collar 112. Four arms 122 are pivotally supported upon pins 124 supported between adjacent ones of the spaced ears 120'.

A fixed collar 130 includes a pair of half clamps 130' having laterally extending flange portions which are interconnected by nut and bolt assemblies 132. A movable collar 134 is provided similar to the movable collar 98, collar 134 also being provided with four spaced pairs of radially outwardly extending ears 134'. A compression spring 136 is interposed between fixed collar 130 and the movable collar 134 thereby normally urging collar 134 toward the fixed collar 112.

Four arms 140 are pivotally supported at one end thereof upon pins 142 supported by adjacent pairs of ears 134'. The opposite end of each of arms 140 is bifurcated as are the opposite ends of arms 122. The bifurcated end portions of arms 140 and 122 are pivotally interconnected by means of pins 144 which also serve to rotatably journal rollers 146 which are supported between the bifurcated end portions of the adjacent arms. It is apparent that spring 136 will urge collar 134 in such a direction as to force the rollers 146 outwardly into engagement with the inner surface of an associated tubular member 30.

It will also be noted that the position of the collars 96 and 130 may be adjusted on the outer portion of the flexible conduit means so as to thereby adjust the amount of spring tension applied to the movable collar means 98 and 134 respectively. In this manner, the force with which the roller members are urged outwardly against the inner surface of the tubular member may be readily adjusted.

Referring now particularly to FIG. 8 of the drawings, the opposite end of the flexible conduit means 56 is operatively connected with a trigger control mechanism indicated generally by reference numeral 150 and including a main body portion 152 adapted to be held in the hand and a manually operable trigger portion 154 which is adapted to be operated for opening and closing the passages through the main body portion 152.

A tubular extension 160 extends forwardly of the main body portion 150 and includes a reduced sleeve portion 162 which is adapted to receive the terminal end of the outer conduit portion 160 which is maintained in operative position thereon by means of a hose clamp 164. A tubular portion 166 is disposed concentrically within tubular portion 160 and is spaced from the reduced sleeve portion 162, tubular portion 166 receiving the terminal end of the inner conduit portion 58 as shown, the conduit portion 58 being tightly fitted upon the tubular portion 166.

A pair of flexible conduits 170 and 172 are connected with the main body portion 150, and as seen in FIGS. 1 and 2, these two flexible conduits are connected with a source of coating material indicated generally by reference numeral 176 which is disposed adjacent to a withdrawal means indicated gnerally by reference numeral 178, the source of coating material as well as the withdrawal means being mounted on the upper surface of a movable support means indicated generally by reference numeral 180. Movable support means 180 includes an upper supporting surface 182 supported at the upper end of a plurality of spaced vertical frame members 184 which are connected with base frame members 186. Wheels 188 are rotatably supported by depending portions extending downwardly from the base portion of the movable support means, these wheels being mounted on tracks 189 which extend substantially perpendicularly to the direction in which the spray coating means moves through the tubular member.

As seen in FIGS. 1 and 2, the source of coating material 176 includes a container 190 adapted to hold a liquid coating material. In a typical example, this coating material may comprise self curing inorganic zinc silicate which can be sprayed onto the interior of a tubular member in a single coat. Other types of coating material may be employed, and in some cases two or more coats may be applied to the interior of the tubular member.

A flexible inlet conduit 192 is connected with a suitable source of air or other gas under pressure (not shown), this air pressure leading into a manifold portion 193. An outlet 194 is provided for liquid coating material which in turn passes through the flexible conduit 170 previously described. An uotlet 196 is provided for air under pressure which travels through the previously described flexible conduit 172. A pair of gauges 198 and 200 are provided for measuring the liquid pressure and air pressure at the source of coating material, and manually operable control valve 202 and 204 are provided for controlling the flow of liquid coating material and air pressure into the spray apparatus of the present invention.

Referring now particularly to FIG. 7, the withdrawal means 178 includes a pair of base plates 210 and 212 which are spaced from one another and which are rigidly affixed to the upper surface of member 182 and extend upwardly therefrom in parallel relationship. Plates 210 and 212 are provided with stepped openings 214 and 216 respectively in the central portions thereof, ball bearing units 218 and 220 being disposed in the stepped openings. Bearing retainer plates 222 and 224 of substantially annular configuration are provided for retaining the ball bearing units in operative position, these plates being secured to the base plates 210 and 212 respectively by means of cap screws 226 extending through suitable openings provided in the retainer plates, the cap screws being threaded into corresponding threaded holes provided in the base plates.

A shaft 230 is rotatably journalled within the ball bearing units 218 and 220, the outer end of shaft 230 being connected with a sprocket 232 which has a drive chain 234 trained thereover for positively driving shaft 230 as hereinafter described. A keyway 240 is provided in shaft 230, and a sheave 242 is drivingly interconnected with shaft 230 through the intermediary of a key 244 fitting within keyway 240. A pair of substantially annular spacer plates 246 and 248 are disposed about shaft 230 on either side of the central hub portion of the sheave 242 and serve to maintain the sheave in proper spaced relationship between base plates 210 and 212.

Sheave 242 is provided with a peripherally extending groove 250 of substantially semi-circular cross-sectional configuration as seen in FIG. 7 and this cross-sectional configuration is such as to be complementary to the configuration of the outer surface of the flexible conduit means 56 whereby sheave 242 is adapted to engage and move the conduit means into or out of a tubular member to be coated as hereinafter described.

A pair of plates 254 and 256 extend outwardly from the outer faces of base plates 210 and 212 respectively, plates 254 and 256 being provided with central holes 255 and 257 formed therethrough. Depending cylindrical members 260 and 261 extend downwardly from the undersurface of plates 254 and 256 and are rigidly affixed thereto as by welding or the like. It will be noted that the cylindrical members 260 and 261 are substantially centered about the holes 255 and 257 respectively.

As seen particulaly in FIG. 2, a pair of guide bars 264 and 266 are supported at the outer surface of base plate 212, bar 264 being retained in operative position by means of a dowel 268 and a cap screw 269, members 268 and 269 extending through suitable openings provided in bar 264 and into corresponding openings provided in plate 212. In a similar manner, guide bar 266 is retained in operative position by means of a dowel 270 and a cap screw 271. As noted in FIG. 1, a similar pair of guide bars 274 and 275 are fixed to the outwardly facing surface of base plate 210.

Referring again to FIG. 7, a top frame 280 is substantially of U-shaped cross-sectional configuration and includes depending side portions 282 and 284. Side portion 282 is snugly received between the guide bars 274 and 275, while depending side portion 284 is snugly received between the guide bars 264 and 266. The interrelationship of the guide bars with these depending side portions guides the top frame for vertical reciprocation.

Laterally extending plates 286 and 288 are fixed to and extend outwardly from the lower portions of the depending side portions 282 and 284 respectively of the top frame. Threaded rods 290 and 292 extend through holes provided in plates 286 and 288 respectively, rod 290 having an enlarged head portion 291 at the lower end thereof, and rod 292 having an enlarged head portion 293 at the lower end thereof. A compression spring 296 is disposed within the cylindrical member 260 in surrounding relationship to rod 290 and bears against the enlarged head portion 291 of rod 290 to urge the rod in a downward direction. A wing nut 297 is threaded on the upper threaded end of rod 290 and is adapted to control the amount of force normally tending to urge the top frame 280 in a downward direction. A similar compression spring 298 is disposed within cylindrical member 261 about rod 292 and bears against the enlarged head portion 293 so as to urge rod 292 downwardly. A wing nut 300 is secured to the upper threaded end of rod 292 for adjusting the amount of spring force normally urging the top frame in a downward direction.

The portions 282 and 284 of the top frame include openings 302 and 304 formed therethrough which are adapted to receive the ball bearing units 306 and 308 respectively. A pair of plates 307 and 309 are suitably fixed to the inner surfaces of portions 282 and 284 and are provided with recess portions adapted to receive the ball bearings units and limit inward movement thereof. Retainer plates 310 and 312 are provided for retaining the ball bearing units in operative position, these retainer plates being held in operative relationship by means of cap screws 314 extending through suitable openings provided in the retainer plates and being threaded into corresponding threaded openings provided in portions 282 and 284 respectively.

A shaft 320 is rotatably journalled within the ball bearing units 306 and 308 and is provided with a keyway 322. A sheave 324 is secured to shaft 320 by means of a key 326 fitting within keyway 322. A pair of spacer plates 328 and 330 are provided about shaft 320 on opposite sides of the central hub portion of the sheave for retaining the sheave in proper spaced position.

The outer periphery of sheave 324 is provided with a groove 335 extending completely therearound and being of substantially semi-circular cross-sectional configuration. As seen in FIG. 7, it is apparent that this groove in the outer periphery of sheave 324 is adapted to fit snugly about the outer surface of the portion 60 of the conduit means, and since the entire top frame 280 as well as the sheave 324 carried thereby is biased in a downward direction, it is apparent that the flexible conduit means will be clamped between the drive sheave 242 and the free running sheave 324 so as to provide a substantially positive driving connection between the withdrawal means and the flexible conduit means to ensure steady uniform and accurately controlled movement of the conduit means between the sheaves during operation of the withdrawal means.

Referring again to FIG. 1, it will be seen that the drive chain 234 is connected with a sprocket 340 secured to the output shaft 342 of a gear reducer mechanism 344 which is in turn driven by an electric motor 346 or any other suitable driving means. A manually controllable rheostat 350 or any other suitable control means is provided for controlling the speed of operation of the driving motor. By suitable adjustment of the rheostat 350, the speed of the driving motor can be accurately controlled which through its positive driving connection with the sheave 242 provides a very accurate control of the speed of movement of the flexible conduit means through the withdrawal means which in turn results in the desired movement of the discharge nozzle through a tubular member to be coated.

In carrying out the method of the present invention, the coating material is first mixed and placed in the container 190 which may comprise a conventional spray pressure pot with an agitator, and the various conduits 56, 170 and 172 are interconnected as shown in the drawings. The tubular member to be coated is then placed in position on the support means 10 as shown in FIGS. 1 and 2 with the extension means in operative position as shown. A straight length of a tubular member is illustrated in FIGS. 1 and 2, but it should also be noted that the present invention is particularly directed to the coating of a tubular member having a bend therein as shown in FIG. 9, and when coating this type of a tubular member, the tubular member 30' as seen in FIG. 9, may be mounted on the support means, with the member 26 of the support means disposed at a suitable angle to support the extension means in proper relationship to the end of the tubular member.

It will of course be understood that the withdrawal means should be mounted substantially in line with the extension means at one end of the tubular member as seen in FIGS. 1 and 2. As pointed out previously, a plurality of tubular members to be coated may be supported on the support means 10, and the withdrawal means can then be readily moved from one tubular member to the next simply by moving its support means 180.

The extension means at the far end of the tubular member from the withdrawal means or in other words the extension means at the end of the tubular member at which the coating operation begins allows the adjustment of the spray pattern without risking a faulty spray pattern in the tubular member itself, and further allows spraying conditions to reach equilibirium before entering the tubular member to be coated. The extension means at the opposite end of the tubular member allows the discharge nozzle to be moved completely through the tubular member before shutting off the flow of coating material through the discharge nozzle.

The flexible conduit means 56 is mounted between the sheaves 242 and 324 of the withdrawal means 178, and the discharge nozzle and the centering means is inserted in that end of the tubular member to be coated which is adjacent to the withdrawal means. The position of the fixed collars of the centering means can then be adjusted so as to adjust the amount of force with which the rollers of the centering means engage the tubular member. The rollers should be maintained with a gentle but firm force against the walls of the tubular member. The tip opening of the discharge nozzle can then be adjusted to the proper gap.

After these adjustments are made, the withdrawal means may be operated in a reverse direction so as to feed the assembly into the tubular member until the discharge nozzle projects beyond the end of the extension means 34. The application rate can then be checked by making a dry run through the tubular member with a stop watch. This can be accomplished by setting the gear reduced mechanism to the desired rate and then operating the drive mechanism of the withdrawal means in the forward direction. In a typical example, the optimum application rate may be on the order of 27 feet per minute. Once the correct withdrawal rate or application rate has been determined, the withdrawal means can then be again actuated in the reverse direction to feed the apparatus back through the tubular member until the tip of the discharge nozzle again projects beyond the end of the extension means 34.

The liquid and air pressure of the container 190 are then adjusted to the desired level by means of valves 202 and 204. In a typical example, the optimum operating pressures have been determined to be on the order to 60 p.s.i. air pressure, and 40 p.s.i. liquid pressure.

Next, with the discharge nozzle remaining stationary, the trigger mechanism 154 which has been previously closed is depressed so as to open the trigger mechanism and to allow the coating material to be discharged through the spray nozzle. A check is then made to see that the spray pattern is correct with the coating material atomizing in a full 360° pattern with no gaps or voids from the discharge nozzle.

After having determined that the spray pattern is correct, the withdrawal means is operated in the forward direction while continuing to maintain the trigger means depressed. The sheaves of the withdrawal means then withdraw the discharge nozzle at a predetermined accurately controlled uniform rate through the tubular member to be coated. This operation is continued until the discharge nozzle has traveled the complete length of the tubular member to be coated and has entered the extension means 32. The trigger means is then released to stop the flow of coating material and the withdrawal means is shut off. The tubular member should then be fully coated with the desired film thickness on the inner surface thereof.

During the travel of the discharge nozzle through the tubular member to be coated, the centering means will maintain the discharge nozzle substantially centered within the tubular member. The centering means 84 is particularly designed such that the arms 102 thereof are substantially longer than the arms 92. This arrangement is of particular utility when negotiating bends in the tubular member and assures that the discharge nozzle will be maintained as nearly centered as possible when negotiating such curves.

Upon completion of the spraying operation, the discharge nozzle is immediately immersed in an appropriate solvent to prevent the coating material from drying in the discharge nozzle. A check should also be made to see that no air is leaking pass the trigger mechanism as such leakage of air may cause the coating material to dry even though the discharge nozzle is immersed in an appropriate solvent.

It is apparent from the foregoing that there is provided according to the present invention new and novel apparatus for coating the interior of tubular members such as vent piping for cargo tanks on tankers and in particular is directed to coating pipes or the like having a bend formed therein. Centering means is provided for maintaining the discharge nozzle substantially centered and in concentric relationship within the tubular member being coated even when negotiating curves formed in the tubular member. Withdrawal means is provided which ensures a uniform and accurately controlled rate of movement of the spray apparatus through the pipe to thereby accurately control the thickness of the coating throughout the length of the tubular member. A new and novel method is also provided according to the present invention for coating the interior of tubular members which is substantially foolproof in operation and which can be carried out even by relatively inexperienced personnel.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

We claim:

1. Apparatus for coating the interior of tubular members comprising spray coating means including a discharge nozzle adapted to discharge coating material in a 360° pattern so as to discharge coating material uniformly on the inner surface of a tubular member through which the coating means travels, conduit means operatively connected with said coating means and being connected with a source of coating material, said conduit means being formed of flexible material so as to readily bend, centering means operatively connected with said conduit means adjacent coating means, and means for moving said conduit means, said centering means and said coating means through a tubular member at a substantially uniform accurately controlled rate comprising a pair of sheaves each of which is provided with a peripheral groove of arcuate cross sectional configuration adapted to engage opposite portions of the outer surface of said conduit means, driving means positively connected with one of said sheaves and adapted to rotate said one sheave at a pre-selected rate, the other of said sheaves being free running, means resiliently biasing the other of said sheaves toward said one sheave so as to resiliently clamp said conduit means between said sheaves, and means guiding movement of said other sheave toward and away from said one sheave.

2. Apparatus as defined in claim 1 wherein said source of coating material includes a container for holding coating material, a source of gas pressure operatively connected with said container for providing means for moving the coating material from said container to said coating means, a movable support means including means for facilitating ready movement of the support means from place to place, said container and said means for moving the conduit means and the coating means through a tubular member being mounted on said movable support means so as to be readily positioned with respect to a tubular member.

3. Apparatus for coating the interior of tubular members comprising a conduit means formed of flexible material so as to be readily adapted to bend, said conduit means defining co-axial passages therethrough for conducting liquid and gas through the respective passages, a spray nozzle connected with one end of said conduit means, said spray nozzle being adapted to discharge coating material therefrom in a 360° pattern so as to discharge the material uniformly on the inner surface of a tubular member through which the discharge nozzle passes, and means for moving said conduit means and the attached discharge nozzle through a tubular member at a substantially uniform accurately controlled rate comprising a pair of sheaves adapted to engage opposite sides of the conduit means, each of said sheaves having a peripheral groove formed therein of arcuate cross-sectional configuration for engaging said conduit means which is of complementary configuration, drive means positively connected with one of said sheaves and including means for accurately controlling the speed of drive, the other of said sheaves being free running and being movable with respect to said first sheave, resilient means normally biasing said other sheave toward said first driven sheave, and guide means for guiding the movement of said other sheave with respect to said one sheave.

4. Apparatus as defined in claim 3 including a movable support means mounted on wheels, said container and said means for moving the conduit means and the discharge nozzle through a tubular member each being mounted on said movable support means.

5. In combination with the structure defined in claim 3, support means for supporting one or more tubular members, a tubular member supported on said support means, and extension means connected with opposite ends of said tubular member for supporting the centering means for movement on either side of the opposite ends of said tubular member.

6. Apparatus for coating the interior of tubular members comprising spray coating means including a nozzle portion for discharging coating material in a 360° pattern so as to discharge the coating material uniformly on the inner surface of a tubular member, conduit means operatively connected with said coating means, said conduit means being formed of flexible material so as to readily bend, said conduit means being operatively connected with a source of coating material, centering means connected with said conduit means adjacent said coating means, said centering means including portions positioned to engage and move along the inner surface of an associated tubular member, said centering means extending outwardly substantially symmetrically with respect to the associated flexible conduit means so as to maintain the conduit means centered within a tubular member through which it moves, and means frictionally engaged with the outer surface of said conduit means at a point remote from said coating means for positively moving the conduit means, the centering means and the spray coating means through an associated tubular member at a substantially uniform accurately controlled rate of movement, said means for moving the coating means through a tubular member including a pair of sheaves having peripheral grooves formed therein of arcuate cross section and positioned to engage opposite portions of said flexible conduit means, means for positively driving one of said sheaves, the other of said sheaves being free running and being resiliently biased toward said first-mentioned sheave, and means for accurately controlling the speed of said driven sheave.

References Cited

UNITED STATES PATENTS

| | | | |
|---|---|---|---|
| 2,461,517 | 2/1949 | Carnevale | 117—96 X |
| 2,800,875 | 7/1957 | Jewell | 118—306 |
| 2,887,118 | 5/1959 | Loeffler et al. | 15—104.06 X |
| 3,078,823 | 2/1963 | Cummings et al. | 118—317 X |
| 3,107,380 | 10/1963 | McLean | 118—408 X |
| 3,118,791 | 1/1964 | McLean | 118—408 |
| 3,237,594 | 3/1966 | Weaver et al. | 118—408 X |

ALFRED L. LEAVITT, *Primary Examiner.*

J. H. NEWSOME, *Assistant Examiner.*